United States Patent [19]

Larson

[11] 4,365,370
[45] Dec. 28, 1982

[54] WATER BED MATTRESS

[76] Inventor: Lynn D. Larson, Rural Route, Walton, Nebr. 68461

[21] Appl. No.: 138,987

[22] Filed: Apr. 10, 1980

Related U.S. Application Data

[62] Division of Ser. No. 38,375, May 11, 1979, Pat. No. 4,240,859.

[51] Int. Cl.³ .............................................. A47C 27/08
[52] U.S. Cl. ............................................. 5/451; 5/422
[58] Field of Search .................. 5/451, 452, 422, 441, 5/449, 450; 156/245

[56] References Cited

U.S. PATENT DOCUMENTS

| | | | |
|---|---|---|---|
| 3,849,814 | 11/1974 | Ross | 5/422 |
| 4,100,634 | 7/1978 | Benjamin | 5/451 |
| 4,152,796 | 5/1979 | Fogel | 5/451 |

Primary Examiner—Alexander Grosz
Attorney, Agent, or Firm—Zarley, McKee, Thomte, Voorhees & Sease

[57] ABSTRACT

A vacuum formed water bed mattress providing a pair of large flat opposite parallel sides and four narrower sides joined to form a substantially right regular parallelopiped is disclosed. One of the large flat sides is made of a heat resistant material. The other flat side and four narrower sides are formed from a single sheet of material by a vacuum and temperature molding process. The two sheets are heat sealed to form the mattress.

6 Claims, 2 Drawing Figures

WATER BED MATTRESS

This is a division of application Ser. No. 38,375 filed May 11, 1979, now U.S. Pat. No. 4,240,859 by Lynn Duane Larson.

BACKGROUND OF THE INVENTION

This invention relates to water beds.

Water bed mattresses generally comprise a flexible outer wall of a plastic such as polyvinyl chloride and a valve for the insertion and removal of water from the interior of the mattress. The plastic outer wall is formed from sheets of plastic seamed at appropriate locations to form a right regular parallelopiped when full of water.

In one type of prior art of water bed mattresses, the seams are along the side and in another type the seams are along the corners and the bottom. It is known for the bottom to include at least a patch of heat-resistant plastic to shield the water bed cover from the heater.

The prior art water beds have the disadvantages of: (1) lacking durability because the seams frequently weaken and cause leaks; (2) being subject to damage or requiring a heat-resistant additional pad on the bottom because heat from the heater causes the plasticizer to leech from the material on the bottom of the water bed mattress, causing breakage and leaks at that location; and (3) being marred in appearance by the seams which are visable from the sides or from the top of the bed.

SUMMARY OF THE INVENTION

Accordingly, a need exists for a water bed mattress which is durable, heat resistant and having a minimum of seams. The instant invention is directed to that need.

It is therefore an object of the invention to provide a novel water bed mattress.

It is a further object of the invention to provide a water bed mattress with seams only around the bottom edge where they are not flexed.

It is still a further object of the invention to provide a water bed mattress with integrally-formed preformed corners.

It is a still further object of the invention to provide a novel water bed mattress which is exceptionally attractive.

It is a still further object of the invention to provide a novel water bed mattress in which seams are not visable from the sides or the top.

It is a still further object of the invention to provide a water bed mattress which has a heat-resistant bottom.

It is a still further object of the invention to provide a novel water bed mattress which presents an attractive appearance and is exceptionally durable.

In accordance with the above and further objects of the invention, the top and side portions of a water bed mattress are vacuum formed, preferably from polyvinyl chloride, with all four corners being vacuum formed and a rim being formed around the top portion of the die connecting the corners (bottom of mattress). A marker is formed in the plastic rim portion at the corners.

To form the corners, male die parts are moved into the female die as a plug assist while the vacuum is pulling the plastic against the die. Each of the male die parts is shaped as right corners and covered with felt or other material selected to avoid sticking to the plastic. The male die parts form the right angle corners at the sides of the mattress at the same time as the vacuum is forming the sides so as to avoid cooling of one portion of the mattress before the others are formed and the consequent thinning of the last formed parts.

To form the bottom of the mattress, the flashing is trimmed, leaving a rim and the formed marker around the bottom. The formed top, sides and rim are removed and a rectangularly-shaped heat-resistant plastic is sealed to the rim, with the corners aligned with the markers.

To seal the bottom, a special die is inserted under the rim. The die has a long center portion and orthogonal end portions so that it lies under one side of the rim and under its two adjacent corners. One side of the bottom is then aligned from corner to corner over the rim and heat sealed across the side and its adjacent corners. The remaining two sides of the rim are sealed to the bottom by placing a straight bar die under each side in succession and sealing the edge of the bottom over the side, with the straight die being removed through the valve after the last side is sealed.

As can be understood from the above description, the water bed mattress of this invention has the advantages of: (1) having an attractive appearance without seams visable from the top and sides; (2) being durable and able to withstand flexing in normal useage; (3) being able to withstand heating without becoming brittle and cracking on the bottom; and (4) being relatively easy and inexpensive to fabricate.

BRIEF DESCRIPTION OF THE DRAWINGS

The above-noted and the other features of the invention will be better understood from the following detailed description when considered with reference to the accompanying drawings in which.

DESCRIPTION OF THE PREFERRED EMBODIMENT

Figure 1:
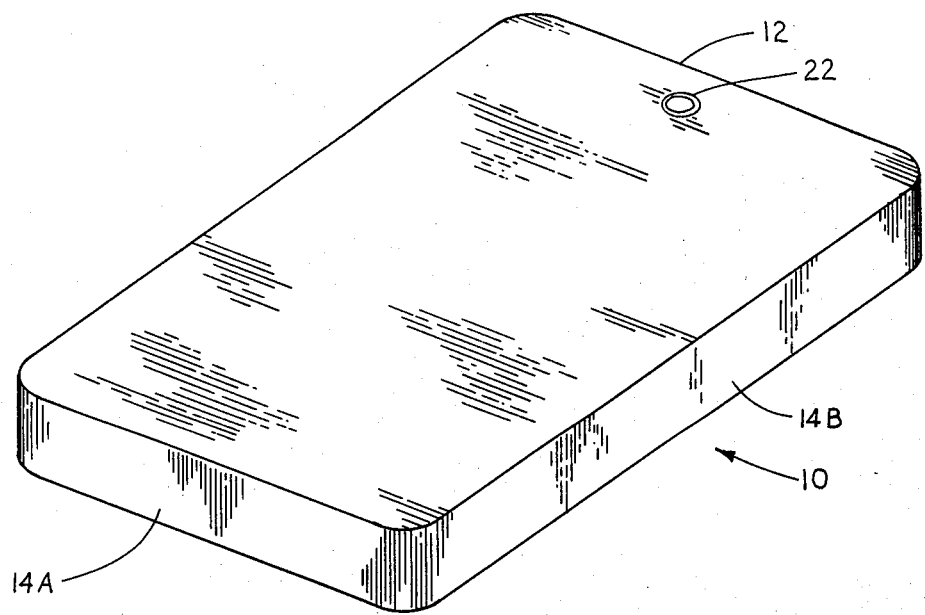
FIG. 1 is a perspective view of a water bed mattress in one position in accordance with an embodiment of the invention.

In FIG. 1 there is shown a water bed mattress 10 having: (1) a top 12 upon which a person rests; (2) sides, two of which 14A and 14B are shown in FIG. 1; and (3) a bottom 16 (shown in FIG. 2). The top side 12 and the side portions are formed integrally with no seams between them, being molded from a single sheet of any plastic material such as polyvinyl chloride so as to withstand stress and provide an attractive appearance. A conventional valve 22 for water and for air release is bonded in a conventional manner to a suitable location on the top surface 12.

Figure 2:
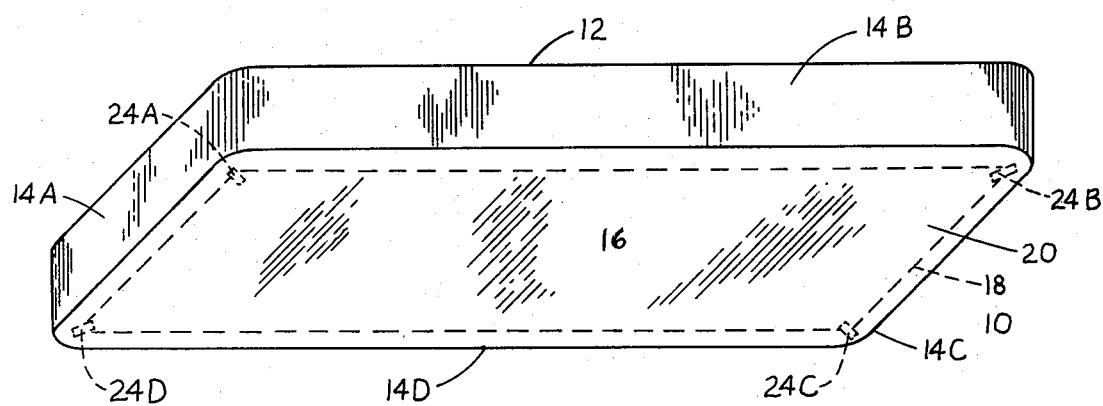
FIG. 2 is a perspective view of the water bed mattress of FIG. 1 from another angle.

In FIG. 2, there is shown the bottom side 16 of the mattress 10 having a rim portion 18 integrally formed with and extending around the four bottom edges of the bottom side 16 of the water bed and overlapped by a bottom sheet 20. The rim 18 is vacuum formed integrally with the top surface 12 and side surfaces (14A and 14B shown) from the same feedstock sheet, which may be polyvinyl chloride (PVC) or another suitable plastic material.

The larger overlapping bottom sheet 20 of the bottom surface 16 is formed of a different material which is heat resistant. This material is less resistant to cracks, pinholes and tears than the polyvinyl chloride used for the other surfaces. However, it has been found that the resistance to cracks, pinholes and tears may be sacrificed in the bottom for increased heat resistance because the bottom side 16 is not flexed to the extent of the other sides and is not put under as much stress. The heat resistance of the material makes it suitable for closer contact with a heater for warming the water within the water bed 10. Also the material used for the top and sides is less expensive than that required for the bottom.

The sheet 20 is heat sealed or solvent sealed over the rim 18, the rim being completely formed with corners during molding of the top and sides of the bed. At each of the corners of the edge 18 is a different one of the formed plastic bubbles 24A–24D which serve as aligning markers for the corners of the bottom surface 20.

The sheet 20 may be made of any heat-resistant material, but it has been found that polyvinyl chloride (PVC) with a specially blended plasticizer will offer extended life even though a heater is used. The blended plasticizer triisooctyl trimellitate (TIOTM) and the blended plasticizer trioctyl trimellitate (TOTM) have both been found suitable. Both are sold by U.S.S. Chemicals, Division U.S. Steel Corporation, 600 Grant St., Pittsburgh, Pa. 15230. The remainder of the water bed 10 may also be of PVC with any of the following plasticizers: (1) DOP; (2) DOTP; or (3) some similar mixture.

The corners can be formed by forming corners which are corners of a parallelopiped which include three substantially perpendicular intersecting edge portions to form three right angle corners.

From the above description, it can be understood that the water bed of this invention has the advantages of: (1) providing a sturdy, attractive top portion of a mattress; (2) enabling the bottom to be made of a heat-resistant material which is suitable for direct heating, if necessary, and yet does not wear out, nor is especially expensive; and (3) permits easy alignment of the bottom section of heat-resistant material with the top section for sealing purposes.

Although specific examples have been described with particularity, many modifications of the examples are possible in light of the above teachings. It is, therefore, to be understood that, within the scope of the appended claims, the invention may be practiced other than as specifically described.

I claim:

1. A water bed mattress comprising:
    a plastic sheet forming a right regular parallelopiped having a first and a second relatively large flat opposite parallel sides and four narrower sides between said relatively large sides;
    the first of said relatively large sides and said narrow sides being integrally formed without seams;
    a rim integrally formed with said four narrow sides; and
    said second of said relatively large sides being sealed to said rim.

2. The water bed mattress as described in claim 1, wherein said second of said relatively large sides being formed of a heat resistant material.

3. A water bed mattress according to claim 2 in which said rim includes deformations at the corners thereof.

4. A water bed mattress in accordance with claim 3 in which said mattress includes eight corners, each of said corners being formed of three substantially perpendicular planar surfaces.

5. A water bed mattress in accordance with claim 4 in which each of said eight corners is integrally formed from said plastic sheet.

6. A water bed mattress according to claim 5, in which said second of said relatively large sides is of a material having greater heat resistance than said first side.

* * * * *

UNITED STATES PATENT AND TRADEMARK OFFICE
CERTIFICATE OF CORRECTION

PATENT NO. : 4,365,370
DATED : December 28, 1982
INVENTOR(S) : Lynn D. Larson

It is certified that error appears in the above-identified patent and that said Letters Patent is hereby corrected as shown below:

On the title page, Item (76) add:
--Ronald Lee Larson, Lincoln, Nebraska--.

Signed and Sealed this

Seventeenth Day of September 1985

[SEAL]

Attest:

Attesting Officer

DONALD J. QUIGG

Commissioner of Patents and Trademarks—Designate